Sept. 20, 1955  M. A. SCHWARTZ ET AL  2,718,142
SOFTNESS TESTER FOR SHEET MATERIAL
Filed July 3, 1952  2 Sheets-Sheet 2
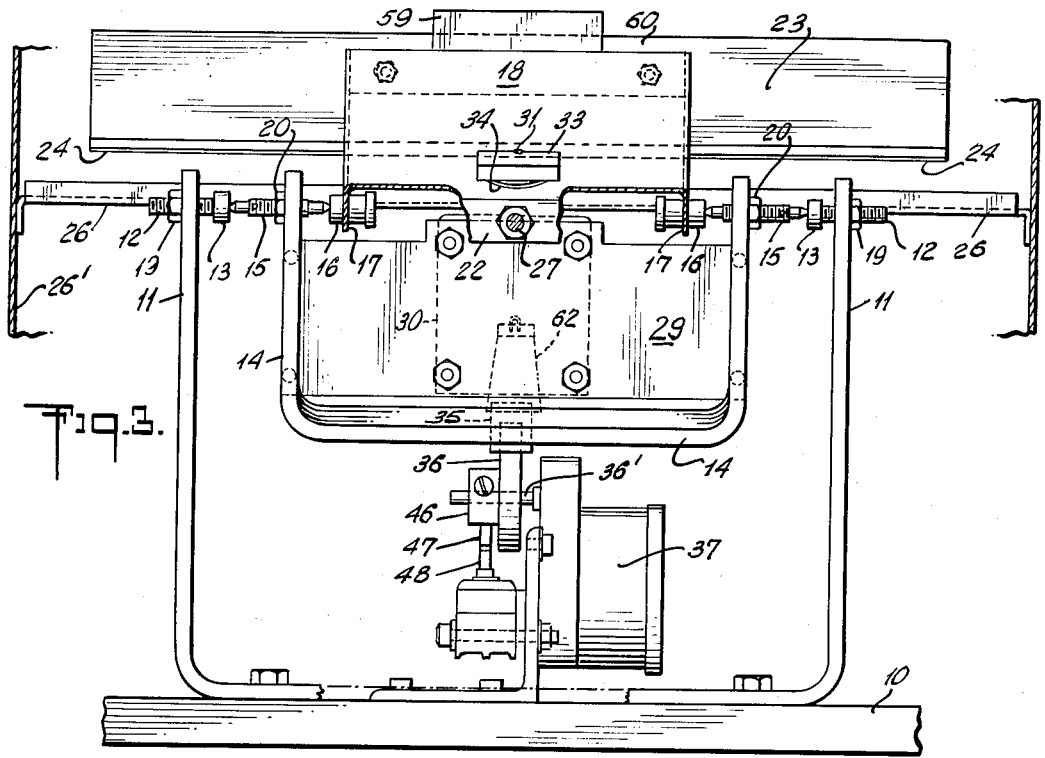
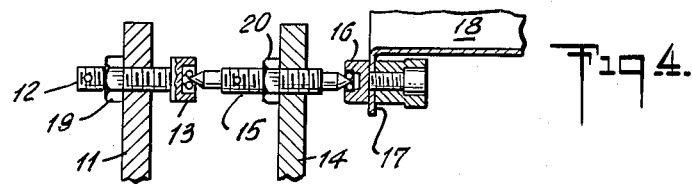
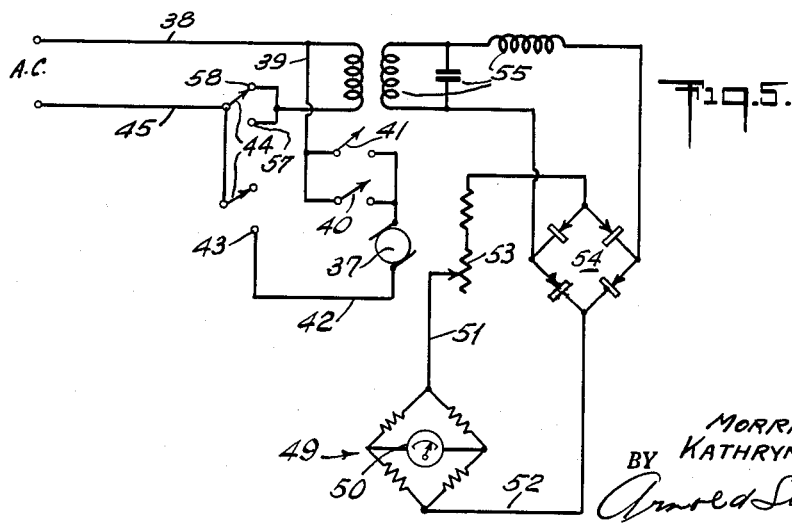
INVENTORS
MORRIS A. SCHWARTZ
KATHRYN E. NOTHNAGLE
BY
ATTORNEY.

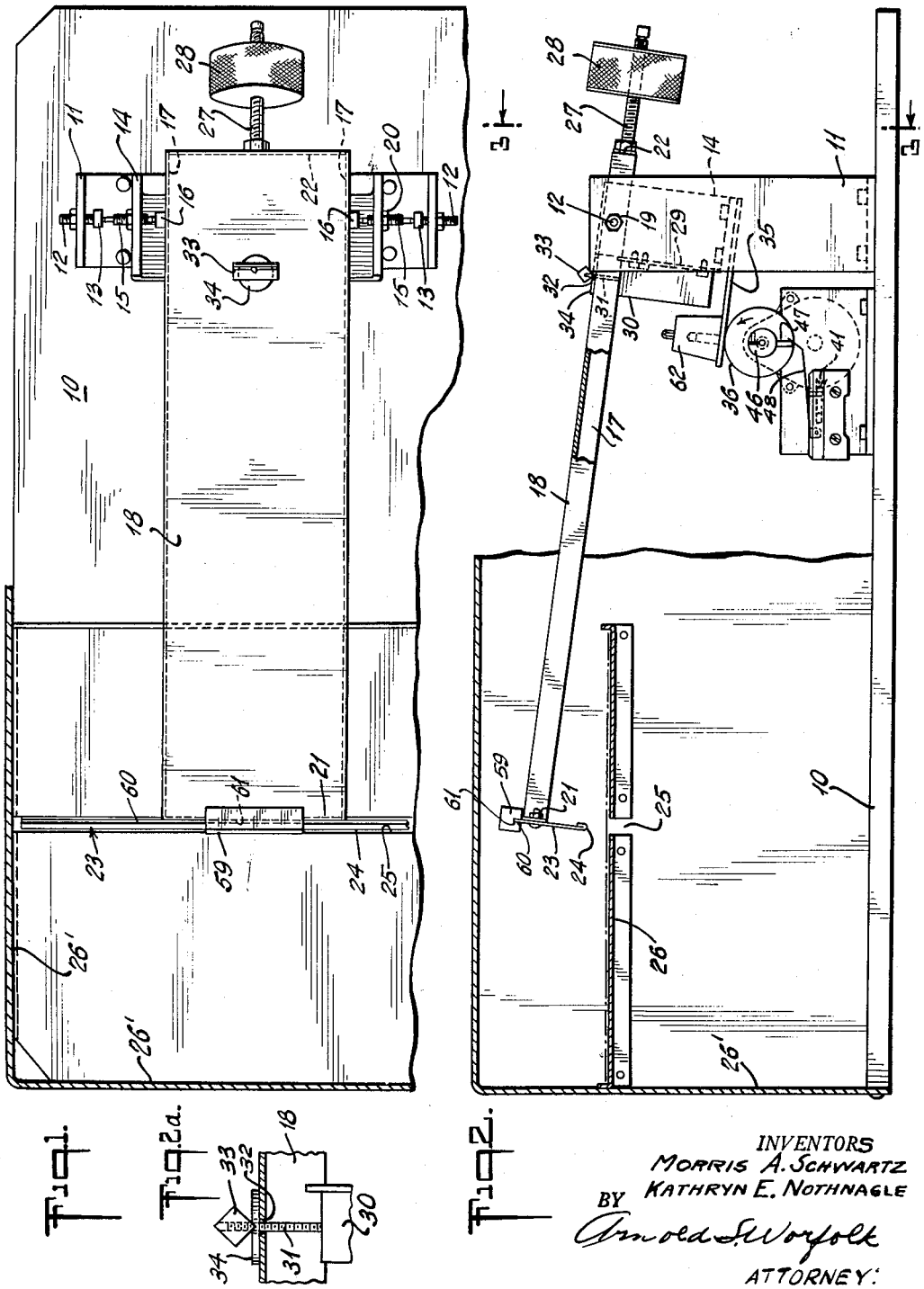

United States Patent Office 2,718,142
Patented Sept. 20, 1955

2,718,142
SOFTNESS TESTER FOR SHEET MATERIAL

Morris A. Schwartz, North Plainfield, and Kathryn E. Nothnagle, New Brunswick, N. J., assignors to Johnson & Johnson, a corporation of New Jersey Application July 3, 1952, Serial No. 296,999

5 Claims. (Cl. 73—100)

This invention relates to an instrument for testing sheet material such as paper, gauze, or the like, to determine softness or flexibility.

If a sheet of paper or like material of given width is placed upon a platform having an aperture or slot extending widthwise of the paper, the force required to form a U-shaped loop in the paper by pushing it through the slot is a measure of the paper's softness. The improved instrument, if properly handled, eliminates possibility of human error and enables extreme accuracy to be obtained in measuring such a force.

An instrument made in accordance with the broader aspects of the present improvements, includes a member presenting an aperture adapted to be spanned by a sheet of material to be tested. A second member is mounted for relative movement through a fixed range with respect to the apertured member to push the sheet of material through the aperture. One of the members is mounted for movement independently of the fixed range of movement between the members, and the resisting force offered by the sheet material to its passage into the aperture is exerted upon the member thus mounted and automatically measured by suitable devices associated with such member.

The instrument selected as illustrative of the preferred embodiment of the invention, includes a beam in the nature of a scale beam fulcrumed on transverse pivots within a yoke which in turn is fulcrumed coaxially therewith on a pair of fixed standards. The beam and yoke are connected together by a strain gauge or transducer in the form of an electrical measuring instrument which operates to vary the flow of current in a circuit proportional to strain placed upon it. The beam is provided at one end with a horizontal transverse blade overlying a slot in a horizontal table on which a sheet to be tested is placed. Means are provided for cycling the yoke in which the scale beam is fulcrumed to cause the blade at the end of the beam to descend from a normal position into engagement with the sheet material, through the slot in the underlying supporting table and then to return to its normal position. If during the cycle of operation the beam supporting yoke pivots through a fixed distance, which it does, the resistance presented by the sheet material to the movement of the blade through the slot is reflected as a force or moment tending to cause relative rotation between the beam and yoke in a direction to strain the transducer. This strain is measurable and is an indication of the softness of the paper undergoing test.

Referring to the accompanying drawings:

Fig. 1 is a top plan view with housing partly removed of a sheet material testing device incorporating the present improvements;

Fig. 2 is a side elevation of the operating parts shown in Fig. 1;

Fig. 2a is an enlarged fragmental vertical section through the connection between the beam and the transducer;

Fig. 3 is a transverse vertical section on an enlarged scale on line 3—3 of Fig. 2 looking from the back toward the front of the instrument;

Fig. 4 is an enlarged fragmental section through the pivotal supports for the movable member and its supporting frame; and Fig. 5 is a circuit diagram of the electrically operated elements with which the instrument is equipped and of the devices for measuring the forces indicating the softness of the sheet material being tested.

Essentially the instrument includes a base 10 supporting a fixed pair of laterally spaced vertical standards 11 having near their upper end, in horizontal and coaxial alignment, a pair of studs 12 which present a pair of opposed inwardly facing anti-friction bearings 13 whose function presently will appear (Figs. 1, 2, 3 and 4). A U-shaped yoke 14 is fulcrumed between the standards 11 by horizontal longitudinally aligned pintles 15 threaded one through each of the spaced legs of the yoke member near their upper ends and whose outer opposed ends engage in the bearings 13. The inner opposed ends of the aligned pintles 15 engage in a pair of outwardly facing anti-friction bearings 16 fixed to lateral flanges 17 depending from a relatively wide plate member 18 constituting a beam which thus is fulcrumed between the legs of the fulcrumed yoke member. The threaded studs 12 which support the bearings in the standards and the threaded pintles 15 permit such adjustments as are required between the bearings and pintles for proper operating efficiency and are held in their positions of adjustment by lock nuts 19 and 20 which may be threaded up tightly against the outer lateral faces of the standards and the yoke respectively.

The lateral depending flanges 17 of the pivoted beam 18 extend throughout the entire length of the beam to insure rigidity and for this purpose too the beam is equipped at its opposite ends with similar depending flanges 21, 22 which preferably are joined to the lateral flanges at all four corners of the beam.

As shown most clearly in Figs. 1 and 2, the beam 18 extends a substantial distance to the left of its fulcrum, i. e., toward the front of the instrument, where it is provided with a transverse blade 23 whose upper portion is fixed to the front vertical flange 21, and whose lower portion which extends substantially beyond the lateral edges of the beam proper, presents a bottom horizontal edge 24 positioned normally to overlie a registering slot 25 in a horizontal table 26 supported by parts 26' preferably fixed to the base 10. The table area is of size sufficient to accommodate flatwise thereon the sheet whose softness is to be tested.

The beam 18 extends for a much shorter distance rearwardly of its fulcrum and to the depending flange 22 at this end there is fixed a rearwardly extending stud 27 threaded to accommodate a weight 28 which is adjustable by rotation along the stud to counterbalance the weight of that portion of the beam which is in advance of its fulcrum.

A transverse substantially vertical plate 29 is secured to the yoke 14 at the front edges of its upwardly extending legs to support a transducer or strain gauge 30 centrally fixed thereon (Figs. 2 and 3). The transducer which may be of commercial variety such as that manufactured and sold by Stratham Laboratories, Inc. under designation Model G1, has a stem 31 which extends upwardly from the top of the transducer and which passes through an overlying hole 32 centrally located in the beam 18 somewhat in advance of its fulcrum (see also Fig. 2a). A nut 33 in the form of a square bar and whose threaded hole extends diagonally from one edge of the bar to the other, is screwed on the transducer stem sufficiently tight to engage an underlying washer 34 encircling the stem 31 and which rests on the top surface of the beam. The arrangement of the nut 33 is such that forces (hereinafter referred to) exerted by the beam on the transducer stem are transmitted through a knife contact, i. e. a corner edge of the nut which is adjusted to lie precisely in a direction transverse of the beam. In the normal position of the parts, i. e. when the blade 23 is in its topmost position, the transducer stem 31 is under some tension, which however, by calibration may be canceled out insofar as the reading of the instrument is concerned. With the beam 18 and the yoke 14 thus interconnected through the transducer 30, any force tending to rotate the beam and the yoke relatively will proportionally strain the transducer.

The U-shaped yoke 14 has fixed to its crossbar a forwardly extending arm 35 which, near its front end, tracks along the peripheral edge of an underlying vertically disposed eccentric 36 fixed on a transverse horizontal shaft 36′ projecting laterally from a reduction gear box and driving motor unit 37 mounted on the base 10 and which may be of standard construction (Figs. 2 and 3). When the arm 35 extending forwardly from the yoke is opposed to the maximum diameter of the eccentric 36, the blade 23 is in its topmost position above the slot 25 in the table 26. However, as the eccentric rotates, the yoke 14 will rock about its fulcrum and cause the beam 18 with its blade 23 to cycle to their lowermost positions as determined by the minimum diameter of the eccentric and then back upwardly to their normal positions as the eccentric completes one revolution.

The motor unit 37 and the transducer 30 are incorporated for operation in an electric circuit illustrated in Fig. 5. The motor is energized from an indicated source of A. C. current through circuit connection including leads 38 and 39, a pair of switches 40 and 41 in parallel, the motor winding, and a lead 42 connected to one pole 43 of a double pole double throw switch 44 and a lead 45 returning to the source. When the switch 44 is closed to make contact through the pole 43, the motor 37 is started by momentarily closing the switch 40. The motor, as it starts, operates to close the other switch 41, which remains closed until one cycle of operation of the eccentric 36 has been completed whereupon the motor is automatically disconnected.

The operation of the cycling switch 41 is best shown in Figs. 2 and 3. On the shaft of the eccentric, there is fixed a collar 46 having a depending finger 47 which, in the normal position of the parts, depresses pivoted member 48 consisting of an arm and a depending finger which engages an underlying resilient arm carrying one contact of the switch 41 to hold the switch in open position. As the motor is energized, by operation of the momentary switch 40, the finger 47 by rotation of the shaft on which it is mounted releases the arm 48 permitting the cycling switch 41 to close. The cycling switch remains closed until the eccentric has completed one revolution whereupon the finger 47 again depresses the resilient arm 48 to open the switch 41 and disconnect the motor, the momentary switch 40 having been opened in the meantime.

The transducer 30 is connected to form a bridge circuit 49 which in the absence of load applied to the beam 18 causes a microammeter 50 connected across mid-points of the bridge circuit to register zero current. The bridge circuit 49 is supplied with rectified current through leads 51 and 52 and an adjustable rheostat 53 from a rectifier 54 which in turn is supplied with alternating current from the A. C. source through a voltage stabilizer 55, the leads 38 and 45 and either pole 57 or 58 of the double pole double throw switch 44 depending upon the position of the latter. The double pole double throw switch 44 permits testing and calibrating the instrument to insure accuracy of operation before actually testing sheet material. Thus when the double pole double throw switch is moved to engage the contact 58 the transducer circuit is energized while the motor circuit remains deenergized.

The instrument may be tested for accuracy of operation as follows:

Let it be assumed that the instrument is to be calibrated so that each gram of force acting at the end of the beam 18 in a direction to rotate the beam and the yoke relatively in a direction to increase the strain on the transducer and thereby unbalance the bridge circuit, shall give a reading of one microamp on the meter 50. A standard weight 59 weighing 40 grams, by way of example, is removably seated at the end of the beam 18 as by providing it with a recess 60 adapted to receive a raised edge portion 61 on the blade 23. The counterbalance weight 28 at the opposite end of the beam is then adjusted until the meter reads zero microamps. The beam is then in balance with no strain on the transducer stem. The weight 59 is then removed and the rheostat adjusted until the microammeter registers 40 microamps. The return of the weight 59 to its position on the end of the beam will then bring the current reading to zero. The instrument has then been calibrated so the reading of the meter in microamps corresponds to the force in grams exerted on the blade end of the beam and is ready for use.

When the instrument has been adjusted for proper reading when the beam is in normal position (which need only be done at relatively infrequent intervals), the switch 44 is adjusted to close the circuits through the contacts 43 and 57 and render operable both the motor and the transducer circuits. A sheet of material to be tested, say paper, then may be placed on the table 26 across the slot 25 and beneath the blade 23. Upon closing the momentary switch 40, the instrument starts to cycle in the manner previously described to cause the blade edge 24 to move down into engagement with the paper and through the slot pushing the paper ahead of it in the form of a loop, the blade then being returned to its normal position as the instrument completes the cycle. The resistance presented by the paper to the movement of the blade through the slot is reflected by an increase in the strain impressed upon the transducer 30. The proportional unbalance of the bridge circuit 49, which thereby results, gives a reading on the microammeter 50 which in turn is proportional to the softness of the paper undergoing test.

To insure that the yoke 14 in its rocking movement, will always follow the eccentric, a weight 62 of any suitable type may be placed upon the yoke extension 35 immediately above the eccentric 36.

It is believed the operation of the instrument will be apparent to those skilled in the art without further description. It should be understood that the invention has been described in connection with one embodiment only thereof and that many modifications are included within its spirit. The invention therefore is to be broadly construed and limited only by the scope of the appended claims.

What is claimed is:

1. An instrument for testing flexible sheet material for softness comprising a table having an aperture of given dimensions therein adapted to be spanned by a sheet of material to be tested, a member of given dimensions movable to push a sheet of material so positioned into the aperture, a frame in which said member is pivotally mounted, means for rotating the frame through a fixed angle of rotation to effect such movement of the member, and means reacting between said member and the frame in which it is pivotally mounted for measuring the force of resistance presented by the sheet material to the movement of the member through the aperture.

2. An instrument for testing flexible sheet material for softness comprising a table having an aperture of given dimensions therein adapted to be spanned by a sheet of material to be tested, a member of given dimensions movable to push a sheet of material so positioned into the aperture, a frame in which said member is pivotally mounted, means for rotating the frame through a fixed angle of rotation to effect such movement of the member, and means including a strain gauge reacting between the member and the frame in which it is pivotally mounted for indicating the force of resistance presented by the sheet material to the movement of the member through the aperture, and electrical devices controlled by said strain gauge for measuring said force.

3. An instrument for testing flexible sheet material for softness according to claim 1 wherein means are provided for adjusting the balance of the member supported in the frame.

4. An instrument for testing flexible sheet material for softness according to claim 1 wherein the aperture in the table is an elongted slot of uniform width throughout its length and wherein the member movable to push the sheet of material into the aperture includes a beam extending from where the member is pivotally mounted in the frame toward the aperture, and a blade mounted at the end of the beam and adapted to be accommodated in the aperture.

5. An instrument for testing flexible sheet material for softness according to claim 2 wherein means are provided for adjusting the balance of the member supported in the frame and wherein the electrical devices are adjustable for zero reading by effecting an adjustment in said balance.

References Cited in the file of this patent

UNITED STATES PATENTS

| | | |
|---|---|---|
| 827,397 | Schauffler | July 31, 1906 |
| 1,335,307 | Wells | Mar. 30, 1920 |
| 1,413,305 | Webb | Apr. 18, 1922 |
| 2,277,199 | Baxendale | Mar. 24, 1942 |
| 2,407,583 | Sprigg | Sept. 10, 1946 |
| 2,484,761 | Stock | Oct. 11, 1949 |
| 2,598,812 | Marco et al. | June 3, 1952 |